United States Patent
Wendt

(10) Patent No.: US 11,619,313 B2
(45) Date of Patent: Apr. 4, 2023

(54) VALVE UPPER PART FOR SANITARY FITTINGS

(71) Applicant: Fluehs Drehtechnik GmbH, Luedenscheid (DE)

(72) Inventor: Joerg Wendt, Luedenscheid (DE)

(73) Assignee: Fluehs Drehtechnik GmbH, Luedenscheid (DE)

(*) Notice: Subject to any disclaimer, the term of this patent is extended or adjusted under 35 U.S.C. 154(b) by 121 days.

(21) Appl. No.: 17/283,140

(22) PCT Filed: Dec. 13, 2019

(86) PCT No.: PCT/EP2019/085119
§ 371 (c)(1),
(2) Date: Apr. 6, 2021

(87) PCT Pub. No.: WO2020/173596
PCT Pub. Date: Sep. 3, 2020

(65) Prior Publication Data
US 2021/0388910 A1 Dec. 16, 2021

(30) Foreign Application Priority Data
Feb. 28, 2019 (EP) .................................... 19159951

(51) Int. Cl.
*F16K 11/078* (2006.01)
*F16K 31/60* (2006.01)

(52) U.S. Cl.
CPC ........ *F16K 11/0782* (2013.01); *F16K 11/078* (2013.01); *F16K 31/60* (2013.01)

(58) Field of Classification Search
CPC ..... F16K 11/0782; F16K 11/078; F16K 31/60
See application file for complete search history.

(56) References Cited

U.S. PATENT DOCUMENTS 3,924,652 A * 12/1975 Kah, Jr. ................ F16K 11/078
137/119.03
3,958,601 A * 5/1976 Schmitt ............... F16K 11/0782
137/636.2

(Continued)

FOREIGN PATENT DOCUMENTS

DE 32 07 895 C2 12/1983
DE 35 25 052 A1 1/1987

(Continued)

OTHER PUBLICATIONS

International Search Report in PCT/EP2019/085119, dated Feb. 7, 2020.

(Continued)

*Primary Examiner* — Craig M Schneider
*Assistant Examiner* — Christopher D Ballman
(74) *Attorney, Agent, or Firm* — Collard & Roe, P.C.

(57) ABSTRACT

A valve upper part for insertion into a sanitary fitting includes a head piece in which a spindle is pivotably mounted, the first end of the spindle projecting from the head piece and the second end thereof engaging via a pin with a control element which is in contact with a stationary passage disc, wherein the passage disc has at least two passage openings and wherein the control element is designed as an adjusting block which is dimensioned such that it can be used to seal at least one passage opening.

20 Claims, 4 Drawing Sheets

(56) References Cited

U.S. PATENT DOCUMENTS

Figure 1:
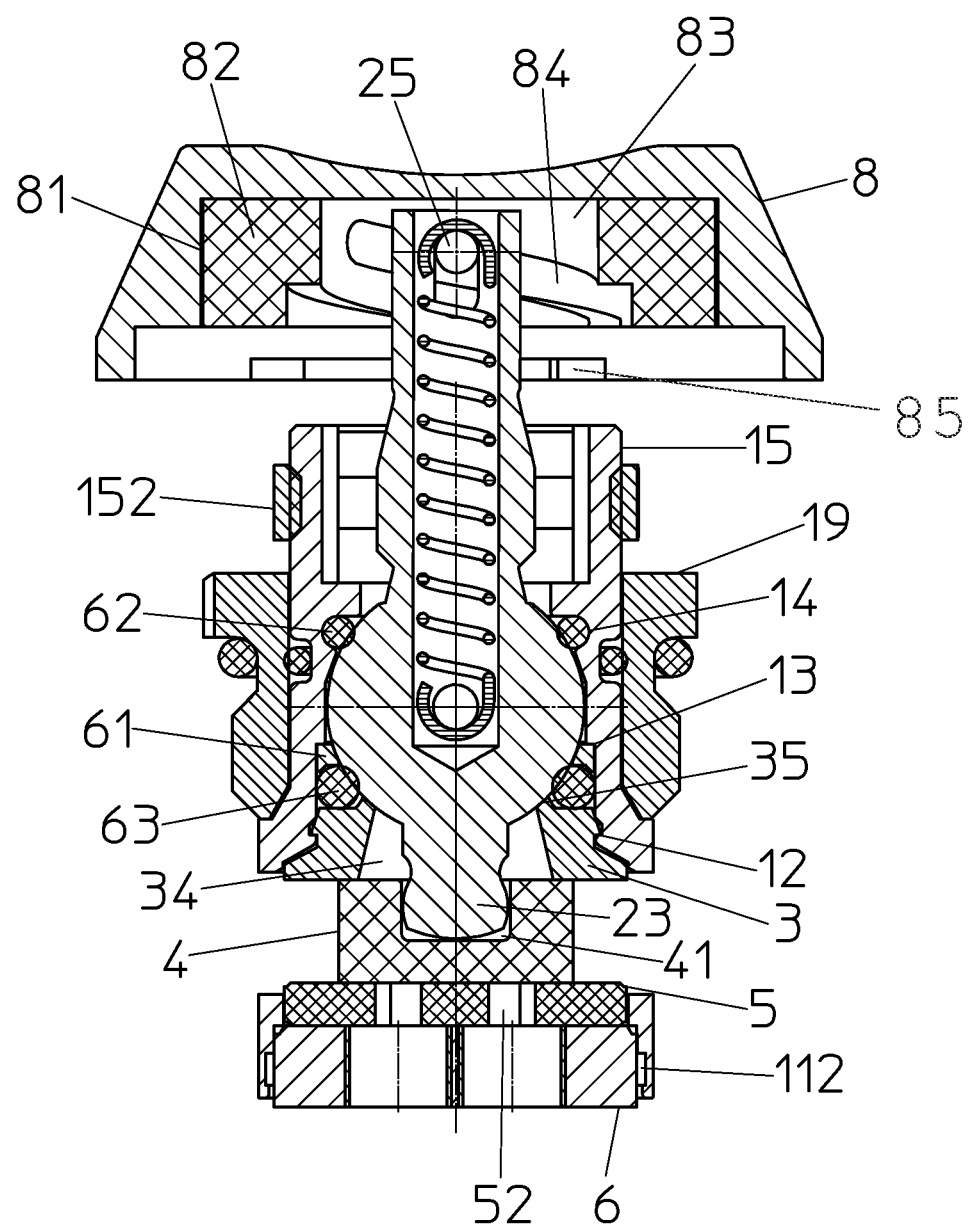

| | | | | |
|---|---|---|---|---|
| 4,051,869 | A | * | 10/1977 | Holt .................... F16K 11/0787 137/636.1 |
| 4,357,957 | A | * | 11/1982 | Bisonaya .............. F16K 11/168 137/454.6 |
| 4,942,902 | A | * | 7/1990 | Knapp ................ F16K 11/0782 251/363 |
| 4,960,154 | A | * | 10/1990 | Dagiantis ............ F16K 11/0787 251/297 |
| 4,971,112 | A | * | 11/1990 | Knapp ................ F16K 11/0782 137/454.6 |
| 5,082,023 | A | | 1/1992 | D'Alayer De Costemore D'Arc |
| 5,095,934 | A | * | 3/1992 | Iqbal .................... F16K 27/045 137/636.2 |
| 5,329,958 | A | * | 7/1994 | Bosio .................... F16K 11/078 251/355 |
| 5,755,261 | A | | 5/1998 | Fukuzawa et al. |
| 5,769,118 | A | * | 6/1998 | Lenberg .................... G05G 1/08 137/553 |
| 5,857,489 | A | * | 1/1999 | Chang ................ F16K 11/0787 137/625.4 |
| 6,394,133 | B1 | * | 5/2002 | Knapp .................. E03C 1/0404 4/677 |
| 7,044,162 | B2 | * | 5/2006 | Bolgar .................. F16K 11/078 137/625.4 |
| 7,063,106 | B2 | * | 6/2006 | Knapp .................. F16K 27/045 251/368 |
| 7,861,742 | B2 | * | 1/2011 | Kim ...................... F16K 31/605 137/636 |
| 8,109,294 | B2 | * | 2/2012 | Kacik ................ F16K 11/0787 251/288 |
| 8,459,303 | B2 | * | 6/2013 | Loschelder ........... F16K 27/045 137/625.41 |
| 9,841,121 | B2 | * | 12/2017 | Ben-Dor ................ F16K 31/605 |
| 10,036,146 | B2 | * | 7/2018 | Ben-Dor ................ E03C 1/0412 |
| 2004/0231735 | A1 | * | 11/2004 | Haenlein ............. F16K 11/0746 137/636.3 |
| 2007/0277889 | A1 | * | 12/2007 | Rosko ................ F16K 11/0782 137/625.4 |
| 2007/0289648 | A1 | * | 12/2007 | Knapp ...................... E03C 1/04 137/625.4 |
| 2008/0023085 | A1 | * | 1/2008 | Rosko .................... F16K 27/045 137/625.4 |
| 2008/0223462 | A1 | * | 9/2008 | Assenmacher ........... E03C 1/04 137/597 |
| 2009/0025808 | A1 | * | 1/2009 | Kacik ................ F16K 11/0787 137/625 |
| 2009/0032128 | A1 | * | 2/2009 | Tucker ................ F16K 11/0787 137/625 |
| 2010/0212760 | A1 | * | 8/2010 | Kim .................... F16K 11/0787 137/605 |
| 2011/0000564 | A1 | * | 1/2011 | Corbin ................ F16K 11/0787 137/625.4 |
| 2015/0260307 | A1 | * | 9/2015 | Chen .................... F16K 11/0785 251/231 |
| 2016/0018011 | A1 | * | 1/2016 | Lange .................... F16K 27/045 137/625.44 |

FOREIGN PATENT DOCUMENTS

| | | |
|---|---|---|
| DE | 690 08 114 T2 | 7/1994 |
| DE | 195 80 519 T1 | 4/1996 |
| DE | 20 2011 103480 U1 | 10/2011 |
| EP | 0 426 587 A1 | 5/1991 |
| EP | 1 462 692 B1 | 11/2006 |
| GB | 1 446 862 A | 8/1976 |
| WO | 2005/085691 A1 | 9/2005 |

OTHER PUBLICATIONS

European Search Report in EP 19159951.3-1015, dated Sep. 12, 2019, with English translation of relevant parts.

* cited by examiner a)

b)

a)

b)

c)

VALVE UPPER PART FOR SANITARY FITTINGS

CROSS REFERENCE TO RELATED APPLICATIONS

This application is the National Stage of PCT/EP2019/085119 filed on Dec. 13, 2019, which claims priority under 35 U.S.C. § 119 of European Application No. 19159951.3 filed on Feb. 28, 2019, the disclosure of which is incorporated by reference. The international application under PCT article 21(2) was not published in English.

The invention relates to a valve upper part for introduction into a sanitary fitting, having a head piece in which a spindle is mounted so as to pivot, which spindle projects out of the head piece with its first end and stands in engagement, by way of a journal, with a control element with its second end, which element stands in contact with a locally fixed passage disk.

Exit of media from fittings, in particular of water from sanitary fittings, is controlled with the aid of valve upper parts. For this purpose, the valve upper part (also referred to as a valve cartridge) is positioned in the housing of a fitting by means of its head piece; a rotary handle or lever is set onto its spindle. In the case of known valve upper parts having a rotating spindle (cf. DE 32 07 895 C2), two disks are provided, in each instance, for controlling the through-flow. The disks are produced from a ceramic material. One of the two disks—adjusting block—is arranged in the valve upper part so as to rotate, with the aid of a driver that stands in connection with the spindle. The other disk—passage disk—is a fixed valve seat disk, also referred to as a fixed disk. When the adjusting block is rotated, the disks slide on one another. A seal is arranged on the side facing the valve seat of the fitting, which seal lies against the passage disk. The seal projects beyond the end face surface of the valve upper part. It serves for providing a seal not only for the passage disk but also toward the valve seat of the fitting.

Ceramic disks are also used in the case of single-lever mixing valves, to control the through-flow (cf. EP 1 462 692 B1). In the case of these valves, a spindle that is mounted so as to rotate and pivot is provided, with the aid of which control of the through-flow takes place. The spindle has a ball, with the aid of which the spindle can pivot in the head piece. Directly subsequently, the spindle has a further ball-shaped part, with which the spindle engages into a driver that stands in connection with the adjusting block. Control of exiting of water takes place here by means of pivoting the spindle, which is moved translationally relative to the locally fixed passage disk, by way of engagement into the adjusting block.

The invention is based on the task of making available a valve upper part having an alternative operating concept, which part has a simple structure and in which a switching function can be achieved merely by pivoting the spindle. According to the invention, this task is accomplished by means of the characteristics of the characterizing part of claim 1.

With the invention, a valve upper part is made available that has a simple structure and with which a switching function can be achieved merely by pivoting the spindle. Due to the fact that the passage disk has at least two through openings, wherein the control element is configured as an adjusting block that is dimensioned in such a manner that at least one through opening can be closed off by way of it, a simple and simultaneously robust structure is achieved, wherein a displacement of the control block is achieved by means of pivoting the spindle, which displacement allows flow of the impending inflow of water through at least one through opening, by covering at least one through opening. In this regard, the head piece preferably has at least one through window that is arranged at the side, wherein the passage disk is arranged below the through window, on its side opposite the spindle.

In a further development of the invention, the through openings are formed, in each instance, by means of overlap, at least in certain areas, of a collection channel introduced into the passage disk on its top side, facing the adjusting block, with an outlet channel introduced into its opposite underside. As a result, adaptation of the inflow side of the passage openings, which can be covered by the control block, and the side of the through openings on the outflow side, which side is to be connected with the outflow lines of a sanitary fitting arranged in the valve seat, is made possible. Complete overlap of collection channel and outlet channel could be achieved, for example, in the form of a through bore through the passage disk. In this case, collection channel and outlet channel would be configured in the identical manner, to be circular.

In an embodiment of the invention, at least one outlet channel is configured to be circular, and at least one collection channel extends beyond the assigned outlet channel on two opposite sides. In this regard, the collection channel is preferably configured to be narrower than the assigned outlet channel. As a result, only a slight displacement of the adjusting block is required to close off the transit opening.

In a further embodiment of the invention, at least one collection channel is configured in arc shape. As a result, increasing overlap of the transit opening is achieved by means of displacement of the adjusting block, and thereby the resistance that counteracts the adjusting block as the result of the pressure of the inflowing water is reduced, and operation is facilitated.

In a further embodiment of the invention, two through openings are provided, which are formed by means of the overlap of two collection channels, which are configured in arc shape in opposite directions from one another, each having an outlet channel configured in circular shape. As a result, through-flow control is made possible by way of only slight displacement paths of the adjusting block.

In a further development of the invention, at least one seal is arranged in the head piece, surrounding the through openings of the passage disk, which seal is preferably configured as a lip seal. As a result, good sealing of the transit openings of the passage disk is achieved with regard to the valve seat of a sanitary fitting.

In a further embodiment of the invention, the spindle engages into a pivot space of a slider on its end that projects out of the head piece, in which space a driver is arranged, by way of which the spindle is connected with the slider. As a result, pivoting of the spindle is made possible merely by a translational movement of the handle part, wherein the movement of the slider is transferred to the spindle by way of the driver. The circular arc movement of the end of the spindle about its pivot axis that is brought about as a result takes place within the pivot space of the slider. For this purpose, the pivot space is configured in such a manner that it holds the end of the spindle in every pivot position. The handle part, configured as a slider, is not involved in this circular arc movement of the first end of the spindle.

In a further development of the invention, the driver is formed by a driver axle, which is passed through an oblong hole that extends in the axial direction of the spindle. As a result, sliding of the driver during a pivoting movement of the spindle within the oblong hole is made possible; a transfer of force between slider and spindle takes place exclusively in the translational movement direction of the slider. In the present case, the term "oblong hole" also includes a slot introduced into the spindle, which essentially represents an oblong hole that is open at the top.

In an embodiment of the invention, the spindle is connected with the driver by way of a spring element. As a result, bias of the slider against the spindle, by way of the driver assigned to it, is achieved, and thereby the slider is held on the displacement surface of the fitting. Preferably, the spring element is formed by way of a helical spring.

In a further embodiment of the invention, the spindle is connected with the head piece so as to pivot, by way of an axle pin, wherein the axle pin is connected with the spring element. Preferably, the spring element is held by a dead-end bore introduced axially into the spindle, which bore is penetrated by the axle pin in the transverse direction, which pin is connected with the spring element. As a result, integration of the spring element into the spindle is achieved, and thereby external impairment of the spring element caused by contamination is prevented, and a compact construction is achieved.

In a further development of the invention, the driver axle is held by a motion link of the slider, which link is preferably introduced into the wall that delimits the pivot space. In this regard, the driver axle can preferably be moved into the motion link and locked in place in a defined position. As a result, easy installation of the slider on the spindle is made possible. For this purpose, the driver axle is introduced into the motion link and brought into an undercut of the motion link by means of rotation of the slider, into which undercut the driver axle slides by means of the bias exerted on it by the spring element, similar to a bayonet closure. The slider is thereby firmly connected with the spindle.

In a further development of the invention, the spindle has a ball-shaped section on which the journal is arranged. In this regard, the spindle preferably lies on a disk guide with its ball-shaped section, in which guide the adjusting block is guided. It is advantageous if the spindle is mounted to float between two seal rings arranged at a distance from one another with its ball-shaped section, which rings are preferably configured as O-rings. In this way, cushioned mounting of the spindle is achieved, and thereby a good feel of the valve upper part is achieved.

In an embodiment of the invention, a display element is arranged on the slider, by way of which element the position of the adjusting block can be displayed. In this regard, the display element is preferably displaceable in the slider, and is arranged to be visible from the outside at least in certain regions, and is connected with the spindle, at least temporarily, in such a manner that it can be displaced relative to the slider by means of pivoting the spindle. As a result, good optical detection of the position of the adjusting block is achieved.

In a further embodiment of the invention, markings are arranged on the slider, which are assigned to a position of the adjusting block, in each instance. As a result, optical detection of the switching position of the valve upper part is made possible (for example "through-flow to the tub spigot made possible, through-flow to the showerhead blocked").

In a further embodiment of the invention, the display element has at least two regions of different colors, and can be displaced relative to a window present in the slider, in such a manner that different colors can be seen through the window as a function of the position of the display element. As a result, optical detection of the switching position by the operator is further improved. Alternatively or in addition, the regions can also be provided with symbols that are positioned in the region of the window in a corresponding position of the adjusting block and can be seen through it.

Furthermore, a sanitary fitting having a valve seat into which at least one inflow channel and at least one outflow channel open and into which a valve upper part of the aforementioned type is introduced in such a manner that the passage openings of the passage disk are connected with the outflow channels is an object of the invention. In this regard, the inflow channel is preferably arranged in such a manner that it lies essentially in a plane with the at least one through window of the head piece of the valve upper part.

In a further development of the invention, a slide plate is provided, through which the spindle is guided and on which the slider of the valve upper part rests in displaceable manner. The slide plate can be formed from any type of material, preferably a smooth material, for example in the form of a glass panel.

In an embodiment of the invention, an inside thread is provided above the valve seat, into which thread a screw sleeve can be screwed to fix the valve upper part in place in the valve seat. Alternatively, the valve upper part can also be insertable into the valve seat so as to simplify orientation of the latter. In this case, the valve upper part must be fixed in place by means of a locking nut or by means of some other locking elements.

Figure 2:
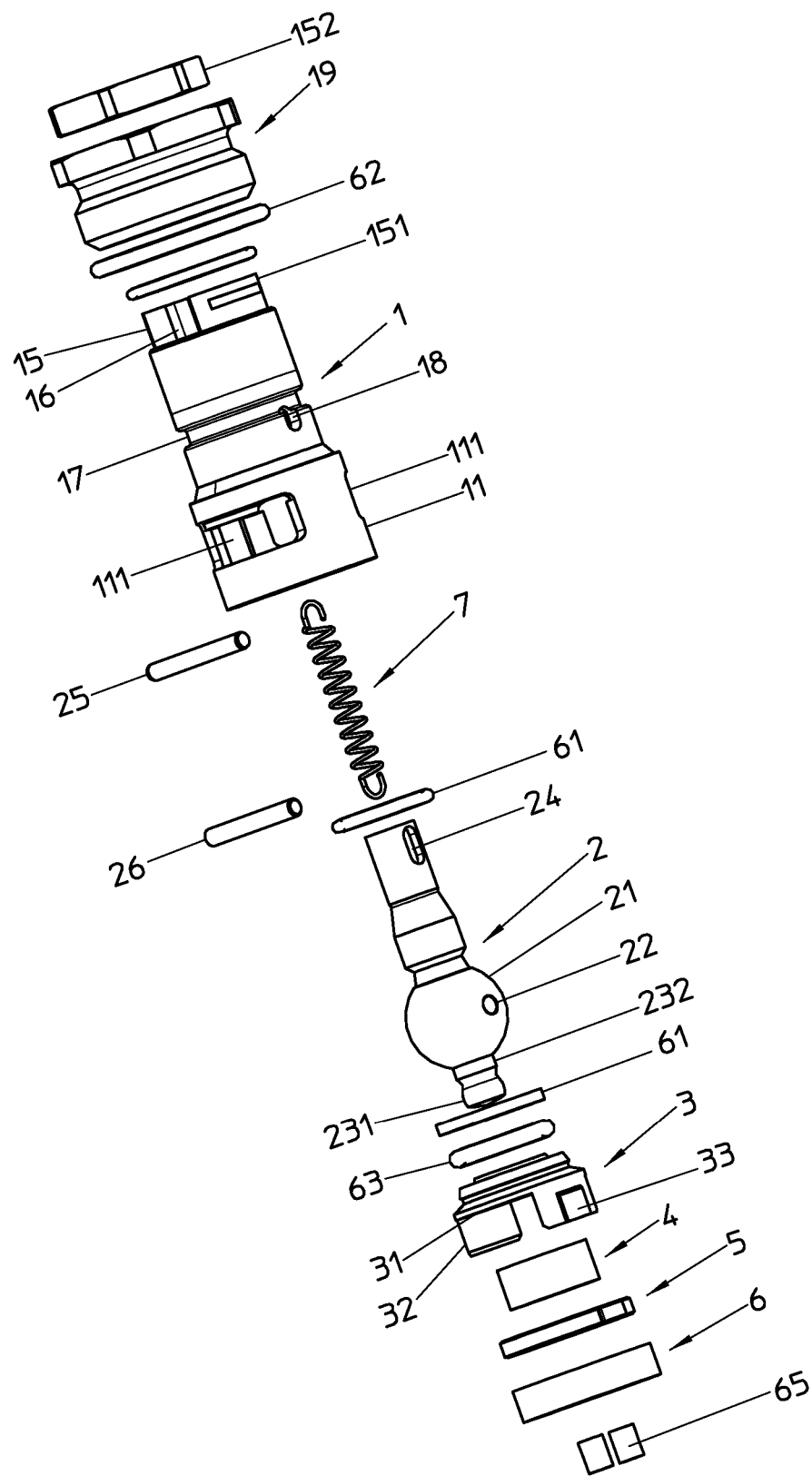
Figure 3:
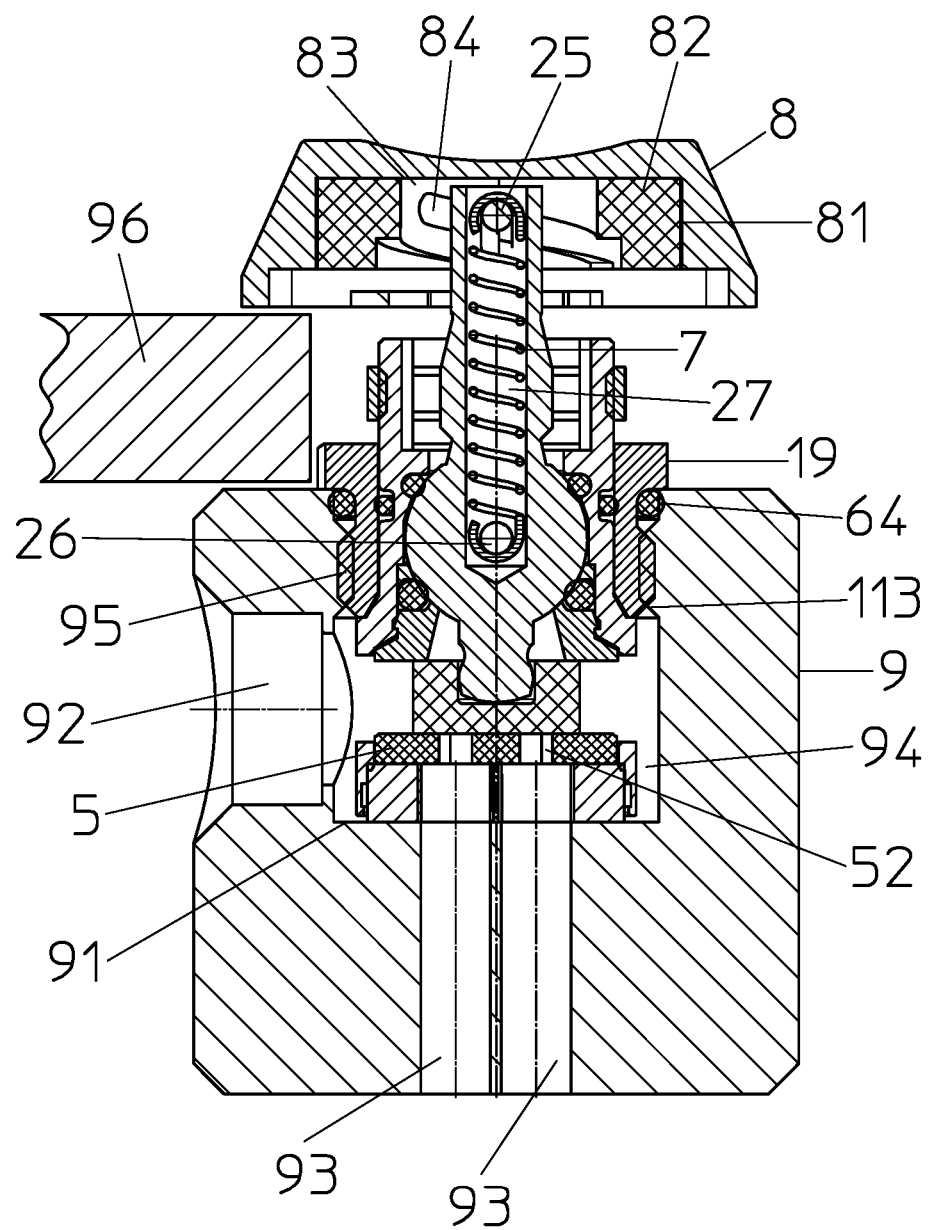
Figure 4:
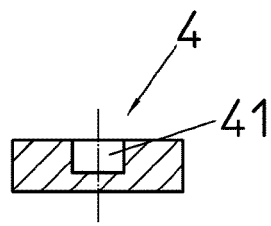
Figure 4:
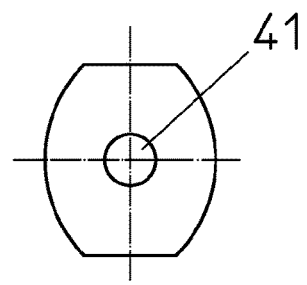
Figure 5:
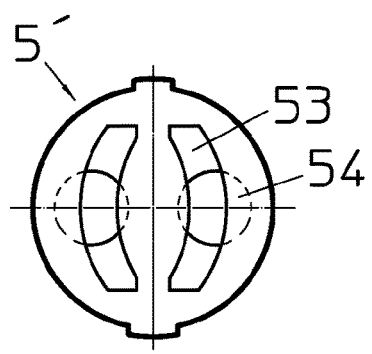
Figure 5:
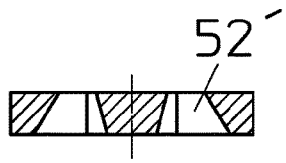
Figure 5:
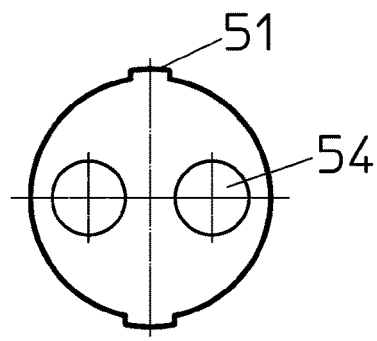
Figure 6:
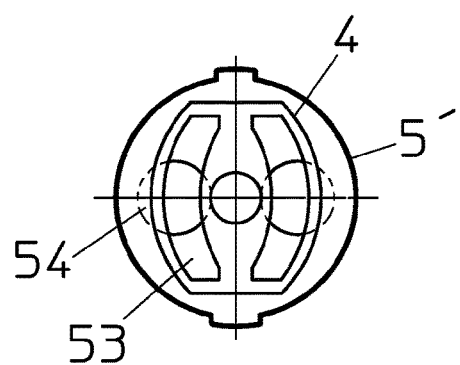

Other further developments and embodiments of the invention are indicated in the remaining dependent claims. An exemplary embodiment of the invention is shown in the drawings and will be described in detail below. The figures show:

FIG. 1 the schematic representation of a valve upper part in longitudinal section;

FIG. 2 the schematic representation of the valve upper part from FIG. 1 in an exploded representation (without slider), FIG. 3 the schematic representation of a sanitary fitting with a mounted valve upper part according to FIG. 1, FIG. 4 the schematic representation of the adjusting block of a valve upper part in a second embodiment
 a) in cross-section;
 b) in a top view;

FIG. 5 the schematic representation of the passage disk of a valve upper part in a second embodiment
 a) in a top view;
 b) in cross-section;
 c) in a view from below;

FIG. 6 the schematic representation of the passage disk from FIG. 5, with an adjusting block according to FIG. 4 positioned on it.

The valve upper part selected as an exemplary embodiment has a head piece 1, through the center of which a spindle 2 guided radially in it passes. The spindle 2 is guided by way of a torque-proof disk guide 3 and stands in engagement with an adjusting block 4, which in turn is guided in the disk guide 3. The adjusting block 4 stands in contact with a passage disk 5, which is held in the head piece and stands in contact with a seal 6 on its side facing away from the adjusting block 4. The spindle 2 holds a helical spring 7, by way of which the spindle 2 is connected with a slider 8.

The head piece 1 consists of a symmetrical hollow body, the two end faces of which are open. On its side facing the fitting 9, the head piece 1 has a sleeve-like part 11, in which two through windows 111 are introduced, diametrically opposite one another, which windows are delimited by longitudinal ridges. On the inside, a groove 112 for holding the seal 6 is introduced in the sleeve-like part 10, on the end side.

On its side facing away from the fitting 9, subsequent to the windows 111, a circumferential engagement groove 12 for an engagement connection of the disk guide 3 is arranged on the inside. In the further progression of the inner contour of the head piece 1, the inside diameter is set back and continued at a lesser diameter, thereby forming a step 13. The step 13 serves for contact of a holding ring 61, which, together with the disk guide 3, forms a holder for a second O-ring 63. The step 13 is followed by a diameter narrowing in the shape of a sphere section, which is delimited by a ring groove 14 for holding a first O-ring 62 and opens into a perpendicular bore that is followed by a guide section 15, which has an elongated opening 16. In the guide section 15, an outside thread 151 for holding an anchor nut 152 is introduced on the outside. Below the guide section 15, a circumferential groove 17 for holding a sealing ring 64 for providing a seal with regard to the fitting 9 is introduced in the head piece 1, on the outside. At a distance from the circumferential groove 17, furthermore two vertical oblong hole bores 18 that lie diametrically opposite one another are introduced into the head piece 1, to hold the axle pin 26 that is guided through the bore 22 of the ball-shaped section 21 of the spindle 2.

The spindle 2 is configured in essentially cylindrical manner and has a ball-shaped formed-on part 21 at one end, in which part a bore 22 for holding an axle pin 26 is introduced, orthogonal to the axis of rotation of the spindle 2. On its side facing the disk guide 3, a journal 23 is screwed into the ball-shaped section 21, coaxial to the axis of rotation of the spindle 2, which journal has a barrel-shaped driver section 231 on the end side, which section is followed by a cylindrical section 232, which lies against the ball-shaped section 21. On its end that lies opposite the journal 23, an oblong hole bore 24 for holding the driver axle 25 is introduced into the spindle 2, orthogonal to its axis of rotation. In the center, the spindle 2 is provided with a dead-end bore 27 that runs along its axis of rotation, which bore opens into the ball-shaped section 21 above the journal 23 and through which the bore 22 as well as the oblong hole bore 24 pass. The dead-end bore 27 serves for holding the helical spring 7, which is held, on the end side, by the axle pin 26 on the one side and by the driver axle 25 on the other side.

The spindle 2 is mounted to float between the first O-ring 62 and the second O-ring 63 in the head piece 1, with its ball-shaped formed-on part 21, and penetrates the elongated opening 16 of the guide section 15.

The disk guide 3 is configured essentially in cylindrical manner. On its side facing away from the ball-shaped section 21 of the spindle 2, a planar guide surface 31 is arranged, which is delimited by two guide ridges 32 that lie diametrically opposite one another. The guide ridges 32 are provided with two guide projections 33 on the outside, which engage into guide grooves—not shown—on the inside of the sleeve-like part 11 of the head piece 1, which grooves run from the groove 112 all the way to the upper edge of the through windows 111. By means of the engagement of the guide projections 33 into the guide grooves of the head piece, torque-proof securing of the guide disk 3 within the head piece 1 is brought about.

A spindle guide 34 in the form of an oblong hole is introduced into the center of the disk guide 3, the longitudinal axis of which hole runs parallel to the guide ridges 32 and passes through the journals 23 connected with the spindle 2. The length of the oblong hole of the spindle guide 34 increases along the axis of rotation of the cylindrical base body in the direction of the guide surfaces 31; consequently, the spindle guide 34 is configured essentially in conical shape. On its end facing away from the guide surfaces 31, the spindle guide 34 is provided circumferentially with a ball holder 35, which is configured in the manner of a chamfer.

The adjusting block 4 is arranged between the guide ridges 32 of the disk guide 3, lying against the guide surface 31. This block has an essentially elliptical outer contour, which is shortened orthogonal to the longitudinal center axis at its longitudinal ends, and thereby two side surfaces that are parallel to one another are formed, which lie against the guide ridges 32 of the disk guide 3. In the center, a dead-end bore 41 is introduced into the adjusting block 4, the diameter of which bore is slightly greater than the diameter of the end of the driver section 231 of the journal 23 of the spindle 2, which end is shaped as a ball-shaped section. In the assembled state, the driver section 231 engages into the dead-end bore 41.

The passage disk 5 is configured essentially as a circular, round disk. It has two guide projections 51 on its circumference, which lie diametrically opposite one another and engage into corresponding guide grooves of the sleeve-shaped part 11 of the head piece 1. Thereby the passage disk 5 is held in the head piece 1 in torque-proof manner. Two through openings 51 are introduced into the passage disk 5, diametrically opposite one another, which openings have an approximately elliptical inner contour. If the spindle 2, with the journal 23 attached to it, is pivoted within the spindle guide 34, then the adjusting block 4 is moved radially on the passage disk 5, and thereby one of the through openings 51 of the passage disk 5 is exposed and the other is closed off. In the center position of the adjusting block 4 shown in FIG. 1, both through openings are closed.

In FIG. 5, a pairing of adjusting block 4 and passage disk 5' of a further embodiment of a valve upper part is shown. Here, two arc-shaped collection channels 53 that run opposite one another are introduced into the top side of the passage disk, which side faces the adjusting block 4, and on the opposite underside of the passage disk, two circular outlet channels 54, arranged diametrically opposite one another, are introduced. A through opening 52' is formed in the region of the overlap of each collection channel 53 with the outlet channel 54 positioned opposite to it.

The head piece 1 is inserted into the valve seat 91 of the fitting 9, wherein the head piece 1 is sealed off with regard to the outflow channels 93 of the fitting 9 by way of the seal 6. The seal 6 is arranged in the head piece 1, surrounding the through openings 52 of the passage disk 5 as well as the outflow channels 93, and provided with support sleeves 65, framing the through openings 52. The head piece 1 is positioned in the valve seat 91 in such a manner that the through windows 111 of the sleeve-like part 11 of the head piece 1 are positioned in a chamber 94 of the fitting 9, into which chamber an inflow channel 92 opens. Above the chamber 94, the fitting has an inside thread 95 into which a screw sleeve 19 is screwed, by way of which the head piece 1 is fixed in place in the fitting 9. In this regard, the screw sleeve 19 lies on a step 113 formed circumferentially on the sleeve-like part 11 of the head piece 1, above the through windows 111. Above the inside thread 95, the screw sleeve 19 is sealed with regard to the fitting 9 by way of a seal ring 64. A glass panel 96—merely indicated in FIG. 3—is attached to the fitting 9, on which panel the slider 8 of the valve upper part lies. The glass panel 96 is fixed in place on the fitting 9 by way of an anchor nut 152, which is screwed onto the outside thread 151 of the guide section 15 of the head piece 1.

The slider 8 has an essentially cylindrical recess 81 on its underside facing the fitting 9, into which recess a motion link insert 82 is inserted. The motion link insert 82 has a pivot space 83, essentially in the form of a hollow cylinder, into the mantle surface of which a motion link guide 84 is introduced, into which the driver axle 25 can be moved and engaged into an undercut of the motion link guide 84. The pivot space 83 of the motion link insert 82 is dimensioned in such a manner that the end of the spindle 2 held by it can be freely moved by way of the pivot movement of the spindle.

The slider 8 is biased against the glass panel 96 arranged on the fitting 9 by way of the driver axle 25 held by the motion link insert 82, which axle is connected with the axle pin 86 of the spindle 2 by way of the helical spring 7. To activate the valve upper part, the slider 8 is displaced along the glass panel 96. This displacement movement is transferred to the spindle 2 by way of the driver axle 25, and the spindle is thereby pivoted about the axle pin 26. In this regard, the end of the spindle 2 situated in the pivot space 83 of the slider 8 runs along an arc, but without coming into contact with a wall of the slider 8. In this regard, the driver axle 25 migrates within the oblong hole bore 24 of the spindle 2. By means of the pivoting movement of the spindle 2, the adjusting block 4, with which the spindle is in engagement by way of the journal 23, is translationally moved on the passage disk 5, in a movement opposite to the slider movement.

To display the corresponding position of the adjusting block 4, in other words of the through opening 52 that has been released or closed off by the block, the slider can be provided with a displaceably arranged display element 85, for example in the form of a pin or a carriage, which can be displaced by means of the end of the spindle 2 that projects into the slider. In this regard, the display element 85 has two sections of different colors, which are moved by way of the end of the spindle 2 as it pivots into the region of a window arranged in the slider 8. The corresponding valve position can be directly detected optically by means of the appearance of one of the two colors in the window.

The invention claimed is:

1. A valve upper part for introduction into a sanitary fitting, having a head piece in which a spindle is mounted so as to pivot,
   wherein the spindle projects out of the head piece with a first end of the spindle and stands in engagement, by way of a journal, with a control element with a second end of the spindle, which element stands in contact with a locally fixed passage disk,
   wherein the passage disk has at least two through openings,
   wherein the control element is configured as an adjusting block that is dimensioned in such a manner that at least one through opening can be closed off by the adjusting block,
   wherein the spindle engages into a pivot space of a slider on the first end that projects out of the head piece, in which space a driver is arranged, by way of which the spindle is connected with the slider,
   wherein the driver is formed by means of a driver axle that is guided through an oblong hole that extends in the axial direction of the spindle,
   wherein the spindle is connected with the driver, and
   wherein the spindle is connected with the head piece so as to pivot.

2. The valve upper part according to claim 1, wherein the head piece has at least one through window that is arranged at the side, wherein the passage disk is arranged below the through window, on a side of the passage disk opposite the spindle.

3. The valve upper part according to claim 1, wherein the through openings are formed, in each instance, by means of overlap, at least in certain areas, of a collection channel introduced into the passage disk on a top side of the passage disk, facing the adjusting block, with an outlet channel introduced into its opposite underside.

4. The valve upper part according to claim 3, wherein at least one outlet channel is configured to be circular, wherein at least one collection channel extends beyond the assigned outlet channel on two opposite sides, wherein preferably, at least one collection channel is configured to be narrower than the assigned outlet channel.

5. The valve upper part according to claim 4, wherein two through openings are provided, which are formed by means of the overlap of two collection channels which are configured in arc shape in opposite directions from one another, each having an outlet channel configured in circular shape.

6. The valve upper part according to claim 3,
   wherein all the outlet channels are configured to be circular,
   wherein at least one collection channel extends beyond the assigned outlet channel on two opposite sides,
   wherein at least one collection channel is configured to be narrower than the assigned outlet channel and in arc shape.

7. The valve upper part according to claim 1, wherein at least one seal is arranged in the head piece, surrounding the through openings of the passage disk.

8. The valve upper part according to claim 1, wherein the spindle is connected with the driver by way of a spring element.

9. The valve upper part according to claim 8, wherein the spring element is a helical spring.

10. The valve upper part according to claim 8, wherein the spindle is connected with the head piece so as to pivot by way of an axle pin connected with the spring element.

11. The valve upper part according to claim 10, wherein the spring element is held by a dead-end bore introduced axially into the spindle and penetrated by the axle pin in the transverse direction.

12. The valve upper part according to claim 1, wherein a display element is arranged on the slider, by way of which element the position of the adjusting block can be displayed, wherein the display element is displaceable in the slider, and is arranged to be visible from the outside at least in certain regions, and is connected with the spindle, at least temporarily, in such a manner that the display element can be displaced relative to the slider by means of pivoting the spindle.

13. The valve upper part according to claim 12, wherein the display element has at least two regions of different colors, and is displaceable relative to a window present in the slider may, in such a manner that different colors can be seen through the window as a function of the position of the display element.

14. The valve upper part according to claim 12, wherein markings are arranged on the slider, which are assigned to a position of the adjusting block, in each instance.

15. The valve upper part according to claim 1, wherein the spindle has a ball-shaped section on which the journal is arranged and with which the spindle is mounted to float between two seal rings, which are arranged at a distance from one another, wherein the spindle lies on a disk guide, in which the adjusting block is guided, with the ball-shaped section.

16. The valve upper part according to claim 15, wherein the seal rings are O-rings.

17. A sanitary fitting having a valve seat, into which at least one inflow channel and at least two outflow channels open and into which the valve upper part according to claim 1 is introduced in such a manner that the passage openings of the passage disk are connected with the outflow channels, wherein the inflow channel is arranged in such a manner that the inflow channel lies essentially in a plane with the at least one through window of the head piece of the valve upper part.

18. The sanitary fitting according to claim 17, wherein a slide plate is provided, through which the spindle is guided and on which the slider of the valve upper part rests in displaceable manner.

19. The sanitary fitting according to claim 17, further comprising an inside thread for holding a screw sleeve for fixation of the valve upper part.

20. The valve upper part according to claim 1, wherein at least one lip seal is arranged in the head piece, surrounding the through openings of the passage disk.

\* \* \* \* \*